Figure 1:
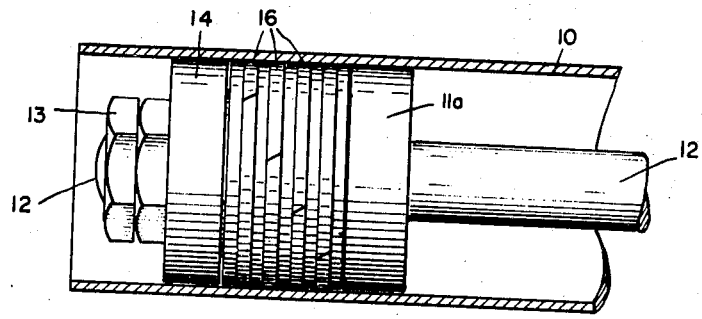

Feb. 8, 1949.   H. C. SANDER   2,460,948
PUMP PISTON
Filed July 17, 1945

INVENTOR.
HANS C. SANDER
BY
Oberlin + Limbach
ATTORNEYS

Patented Feb. 8, 1949

2,460,948

UNITED STATES PATENT OFFICE 2,460,948

PUMP PISTON

Hans C. Sander, Denver, Colo., assignor to Continental Oil Company, Ponca City, Okla., a corporation of Delaware Application July 17, 1945, Serial No. 605,505

2 Claims. (Cl. 309—4)

This application is a continuation-in-part of my co-pending application, Serial No. 460,449, filed October 1, 1942, now abandoned.

My invention relates broadly to pump pistons and more particularly to a unique construction that promotes the easy and inexpensive manufacture of the piston and expedites installation thereof or replacement of worn parts.

In use, the piston rings of a pump become worn; also, constituents of the fluid being pumped frequently deposit on the piston and piston rings, causing the rings to stick. Upon the occurrence of either or both of these contingencies, it is necessary that the piston be removed. If the rings are badly worn, they must be replaced. If they are stuck, they must be cleaned and the piston regrooved. These operations require the expenditure of considerable time and labor and obviously the pump is idle while they are being performed.

In my construction, the piston rod passes centrally through the piston in the conventional manner, the piston being retained thereon by lock nuts threaded on the projecting end of the rod. An annular cage having piston rings fitted in peripheral grooves is sleeved on the piston. The case is clamped between an integral shoulder and a removable end plate by the lock nuts. It is necessary only to unscrew the nuts and back off the end plate in order to remove the cage and piston rings as a unit.

In operation, the cage is held so that there is no relative axial movement between it and piston; however a limited amount of transverse movement between the cage and piston is possible. A number of cages can be made for the piston and, when one becomes worn or stuck a new one can be immediately fitted in its place. The pump is ready for service as soon as the new ring and cage assembly has been secured on the piston. My construction permits this transfer to be effected much faster than any other construction within my knowledge. Consequently, considerable time and labor are saved. I have eliminated the necessity of tediously removing the rings, cleaning them, replacing them, and possibly regrooving the piston before the pump can be used. The ring-cage assembly can be made cheaply and in great quantities.

After a unit has been removed from the pump, the rings can be cleaned or replaced, or the cage reground at leisure.

An important object of my invention is the provision of a novel piston ring and cage assembly that is simple and inexpensive to manufacture and that may be easily removed and installed.

Other objects and advantages of my invention will be apparent during the course of the following description.

Figure 2:
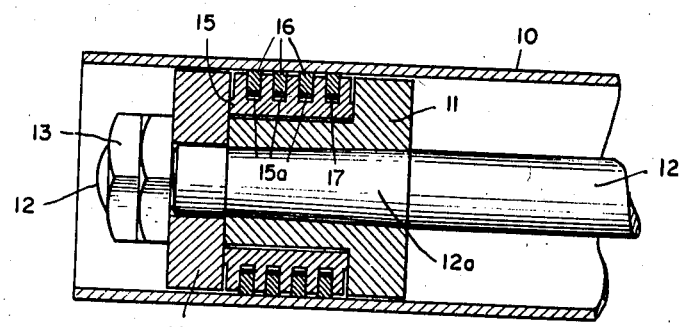
Figure 3:
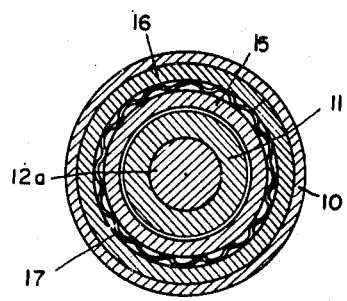

In the drawing forming a part of the specification and wherein like numerals are employed to designate like parts throughout the same, Fig. 1 is a longitudinal sectional view through a pump cylinder, showing a piston embodying my invention in elevation, Fig. 2 is a view similar to Fig. 1 but showing both the cylinder and piston in longitudinal section, and Fig. 3 is a transverse sectional view, taken on the line 3—3 of Fig. 1.

In the drawing, wherein for the purpose of illustration is shown a preferred embodiment of my invention, the numeral 10 designates a pump cylinder in which the piston 11, carried by piston rod 12, is mounted for reciprocation. The tapered end 12a of piston rod 12 extends through a longitudinal bore in the piston and lock nuts 13 are threaded on the projecting end thereof.

In prior construction, the piston is made in one piece and lock nuts 13 engage directly against the piston.

Piston rings fitted in grooves in the periphery of the piston cage wipingly engage the inner wall of cylinder 10. When the piston rings become worn or stuck, it is necessary to remove the piston from the cylinder, unscrew lock nuts 13 move end plate 14 and remove the piston from the piston rod. While the piston is out of the cylinder, it is usually regrooved and provided with new rings. However, this is a tedious task and the pump is idle for a considerable time.

I propose to obviate these difficulties by making the piston 11 of substantially lesser diameter than the cylinder 10. An annular cage 15, sleeved on the piston, is held between a radial flange 11a integral with the upper end of the piston and an end plate 14 between the lower end of the piston and lock nuts 13. The parts as made are so proportioned that the axial length of the annular cage 15 is such as to have a sliding fit for relative lateral movement between the end plate 14 and the radial flange 11a, i. e., so that there may be no relative axial movement between the cage and the piston but the cage may move laterally with respect to the piston by virtue of the fact that its inside diameter is, as shown in the drawings, slightly greater than the outside diameter of that portion of the piston with which the cage is in telescopic engagement. If desired, the axial length of the cage 15 may be made very slightly greater than the distance between the plate 14 and the radial flange 11a. Then, when the parts are assembled, sufficient shims may be placed under the plate 14a when the same is drawn up by the lock nuts 13 to provide the proper fit between the cage and the piston. The cage has spaced peripheral grooves 15a in which piston rings 16 are fitted. The piston rings are pressed outwardly by expander rings 17. As indicated above, the cage has a slightly greater inside diameter than the outside diameter of that area of the cylinder with which the cage is in telescopic engagement. The difference between the outside diameter of the cylinder and the inside diameter of the cage may vary from about 1/32 inch to 3/32 inch.

If the rings become worn or stuck, it is necessary only to unscrew lock nuts 13 and remove end plate 14 from the piston rod. Cage 15 and rings 16 and 17 may then be removed from the cylinder as a unit. Another cage, fitted with new rings, may be quickly applied to the piston and end plate 14 and nuts 13 replaced. As indicated above, when the new cage is slightly longer than the distance between the radial flange 11a and the plate 14 when the latter is drawn up by the lock nuts 13, suitable shims may be placed under the plate 14 in order to provide the desired sliding fit between the cage and the piston. The pump is then ready for operation.

The ring-cage assembly may be cleaned and regrooved at leisure.

The parts comprising the piston construction of this invention are all such that they may be formed to rather close tolerances by relatively inexpensive machining or grinding operations. For example, it is relatively simple and inexpensive to provide a plurality of cages of substantially the same length by flat grinding the ends of such cages and in this connection it will be noted that the bearing area between the end of the cage and the plate 14 and the radial flange 11a is restricted to a reduced area which if a particular cage is found to be too long for a particular piston, the necessary adjustment may be made by grinding or otherwise removing a portion of the shoulder on one or both ends of the cage with which the latter has contact with the plate 14 and the radial flange 11a. Peripheral grooves 15a may be easily and quickly cut in the cage 15 with a grooving tool; rings 16 and expander rings 17 can be easily assembled; and the ring-cage assembly can be easily and quickly installed on the piston.

The cage may be made from any suitable material, such as steel, brass or plastic. I have found that rings made from Micarta are satisfactory. Micarta rings do not score cylinder walls as quickly as metal rings nor do they pick up sand or grit from the material being pumped.

It is to be understood that the form of my invention herein shown and described is to be taken as a preferred example of the same and that various changes in the size, shape and arrangement of parts may be resorted to without departing from the spirit of my invention or the scope of the appended claims.

Other modes of applying the principle of the invention may be employed, change being made as regards the details described, provided the features stated in any of the following claims or the equivalent of such be employed.

I therefore particularly point out and distinctly claim as my invention:

1. In a piston construction comprising a body portion and a piston rod rigidly secured to said body in substantial axial alignment therewith, a quick-replaceable multiple piston ring unit assembly comprising an axially removable annular cage provided with a plurality of axially spaced ring grooves on its periphery and means securing said annular cage to said body for limited relative transverse movement without any substantial relative axial movement.

2. A piston construction comprising a cylindrical body having an external radial shoulder at one end, a piston rod rigidly secured to said body in axial alignment therewith, an end plate having an outside diameter substantially the same as the outside diameter of said shoulder, means for removably securing said end plate to the end of said body remote from said shoulder and in axial alignment with said body, a multiple piston ring unit-assembly including an axially removable annular cage on said body between said shoulder and end plate, axially spaced circumferential grooves in said annular cage, and piston rings in said grooves, said annular cage having an axial extent such that it has a sliding fit in a radial direction between the opposed faces of said shoulder and end plate and having an inside diameter sufficiently greater than the outside diameter of said body to permit it to become substantially eccentric with respect to said piston rod as the latter may become eccentric with respect to the cylinder with which said piston operates.

HANS C. SANDER.

REFERENCES CITED

The following references are of record in the file of this patent:

UNITED STATES PATENTS

| Number | Name | Date |
|---|---|---|
| 912,460 | Frisk | Feb. 16, 1909 |
| 1,088,520 | Black | Feb. 24, 1914 |
| 1,595,305 | Kibele | Aug. 10, 1926 |
| 1,917,639 | Evans | July 11, 1933 |
| 2,272,687 | Bowers | Feb. 10, 1942 |
| 2,277,501 | Murray | Mar. 24, 1942 |
| 2,279,238 | Larson | Apr. 7, 1942 |
| 2,394,408 | Starr | Feb. 5, 1946 |